(12) United States Patent
Yoshida et al.

(10) Patent No.: US 9,612,486 B2
(45) Date of Patent: Apr. 4, 2017

(54) LIQUID CRYSTAL DISPLAY DEVICE

(71) Applicant: Sharp Kabushiki Kaisha, Osaka (JP)

(72) Inventors: Hidefumi Yoshida, Osaka (JP); Yosuke Iwata, Osaka (JP); Mitsuhiro Murata, Osaka (JP); Yasuhiro Nasu, Osaka (JP); Koichi Miyachi, Osaka (JP); Tsuyoshi Kamata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 128 days.

(21) Appl. No.: 14/409,185

(22) PCT Filed: Jun. 6, 2013

(86) PCT No.: PCT/JP2013/065658
§ 371 (c)(1),
(2) Date: Dec. 18, 2014

(87) PCT Pub. No.: WO2013/191004
PCT Pub. Date: Dec. 27, 2013

(65) Prior Publication Data
US 2015/0177571 A1    Jun. 25, 2015

(30) Foreign Application Priority Data

Jun. 21, 2012   (JP) ................. 2012-140104

(51) Int. Cl.
*G02F 1/1343*   (2006.01)
*G02F 1/133*    (2006.01)
(Continued)

(52) U.S. Cl.
CPC ...... *G02F 1/134309* (2013.01); *G02F 1/1336* (2013.01); *G02F 1/13306* (2013.01);
(Continued)

(58) Field of Classification Search
CPC .. G06F 1/13306; G06F 1/1336; G02F 1/1343; G02F 1/1335; G02F 1/1336
See application file for complete search history.

(56) References Cited

U.S. PATENT DOCUMENTS 6,469,765 B1   10/2002  Matsuyama et al.
8,947,624 B2 *  2/2015  Murata ............. G02F 1/134363
                                                   349/130
(Continued)

FOREIGN PATENT DOCUMENTS

JP    2000-356786 A   12/2000
JP    2002-23178 A    1/2002
(Continued)

*Primary Examiner* — Carolyn R Edwards
(74) *Attorney, Agent, or Firm* — Chen Yoshimura LLP

(57) ABSTRACT

A liquid crystal display device is provided that has favorable display characteristics in a display mode using a vertical electric field and a horizontal electric field. This liquid crystal display device includes a first substrate and a second substrate arranged facing each other, and a liquid crystal layer sandwiched between the first substrate and the second substrate. The liquid crystal layer has liquid crystal molecules having a negative dielectric anisotropy, and the first substrate has a plate-shaped first common electrode and a pixel electrode formed in a separate layer from the first common electrode with an insulating film therebetween. The pixel electrode has a comb-shaped structure, and the second substrate has a second common electrode with a liquid crystal orientation structure that is linear in a plan view.

5 Claims, 14 Drawing Sheets

(51) Int. Cl.
   *G02F 1/1335*   (2006.01)
   *G02F 1/137*   (2006.01)
(52) U.S. Cl.
   CPC .............. *G02F 1/134363* (2013.01); *G02F 2001/13712* (2013.01); *G02F 2001/134381* (2013.01)

(56) References Cited

U.S. PATENT DOCUMENTS

| | | |
|---|---|---|
| 2002/0159018 A1 | 10/2002 | Kataoka et al. |
| 2003/0048401 A1 | 3/2003 | Kataoka |
| 2005/0146664 A1 | 7/2005 | Hanaoka et al. |
| 2008/0137018 A1* | 6/2008 | Lin .................. G02F 1/134363 349/141 |
| 2011/0176100 A1* | 7/2011 | Nishida ............. G02F 1/134363 349/143 |
| 2012/0050246 A1* | 3/2012 | Morimoto ......... G02F 1/134363 345/211 |
| 2012/0169981 A1* | 7/2012 | Murata ............. G02F 1/134363 349/138 |
| 2012/0182512 A1* | 7/2012 | Sakurai ............. G02F 1/134363 349/141 |

FOREIGN PATENT DOCUMENTS

| | | | |
|---|---|---|---|
| JP | 2002-107730 A | 4/2002 | |
| JP | 2002-357830 A | 12/2002 | |
| JP | 2008-197691 A | 8/2008 | |
| JP | WO 2011016267 A1 * | 2/2011 | ....... G02F 1/133528 |
| JP | WO 2011043103 A1 * | 4/2011 | ....... G02F 1/134363 |

* cited by examiner (a)

(b)

LIQUID CRYSTAL DISPLAY DEVICE

TECHNICAL FIELD

The present invention relates to a liquid crystal display device. More specifically, the present invention relates to a liquid crystal display device that performs black display by applying a vertical electric field to liquid crystal having a negative dielectric anisotropy and that performs white display by applying a horizontal electric field thereto.

BACKGROUND ART

A liquid crystal display (LCD) device controls the transmittance of light (turning display ON/OFF by allowing light to pass or blocking light) by controlling liquid crystal molecules that have birefringent properties. Examples of liquid crystal orientation modes of LCDs include: the TN (twisted nematic) mode, in which liquid crystal molecules having a positive dielectric anisotropy are oriented in a 90° twisted state when seen from a direction normal to the substrate; the vertical alignment (VA) mode, in which liquid crystal molecules having a negative dielectric anisotropy are oriented perpendicular to the substrate surfaces; the IPS (in-plane switching) mode, in which liquid crystal molecules having a positive dielectric anisotropy are oriented horizontal to the substrate surface and a horizontal electric field is applied to the liquid crystal layer; the FFS (fringe field switching) mode, and the like.

Liquid crystal display devices are thin, lightweight, and have low power consumption, and thus are widely used in display devices such as televisions, computers, PDAs, and the like. In recent years, the size of liquid crystal display devices has been rapidly increasing, as seen in liquid crystal display televisions and the like, in particular.

In VA mode, liquid crystal with a negative dielectric anisotropy is used, and display is performed by the liquid crystal molecules that are vertically oriented to the substrate surfaces to be horizontally oriented through a vertical electric field, but if a liquid crystal molecule is seen from a different angle, the perceived birefringence of the liquid crystal molecule changes, and thus causes a problem of having narrow viewing angles.

In order to widen the viewing angles in VA mode, linear projections or electrode slits are provided as orientation regulating structures for multi-domain vertical alignment (MVA) modes. This makes it possible to control the liquid crystal orientation direction when a voltage is applied such that the liquid crystal molecules are oriented in a plurality of directions, even without applying a rubbing treatment to the alignment films, thereby making it possible to obtain viewing angle characteristics that are superior to the conventional TN mode. It is also possible to improve viewing angle characteristic by forming a polymer layer (PSA/polymer sustained alignment) on the substrate and dividing the orientation or the like. A method of dividing orientation has been proposed in which voltage is applied to a liquid crystal layer having light-curable monomers in order to orient the liquid crystal molecules into a plurality of different directions along micro-slits formed in the pixel electrodes. Ultraviolet rays are radiated when the orientation directions are stable in order to harden the light-curable monomers, thereby securing the directions in which the liquid crystal molecules tilt (Patent Documents 1 to 3, for example).

In IPS mode, display is performed by using a horizontal electric field that occurs between a pair of comb-shaped electrodes and by taking advantage of the nature of liquid crystal molecules trying to become horizontally oriented to the electric field. In FFS mode, display is performed by using a horizontal electric field (fringe electric field) that occurs between a common electrode and pixel electrode with an insulating layer therebetween and by taking advantage of the nature of liquid crystal molecules trying to become horizontally oriented to the electric field. The viewing angles are improved in IPS mode and in FFS mode, but it is difficult to obtain a contrast ratio similar to VA mode.

Furthermore, recently, there has been new research in controlling the driving of the liquid crystal in display devices that conventionally perform display by using a horizontal electric field, such as IPS mode or FFS mode devices, by generating an additional vertical electric field (see Patent Documents 4 and 5, for example).

RELATED ART DOCUMENTS

Patent Documents

Patent Document 1: Japanese Patent Application Laid-Open Publication No. 2002-107730
Patent Document 2: Japanese Patent Application Laid-Open Publication No. 2002-357830
Patent Document 3: Japanese Patent Application Laid-Open Publication No. 2008-197691
Patent Document 4: Japanese Patent Application Laid-Open Publication No. 2000-356786
Patent Document 5: Japanese Patent Application Laid-Open Publication No. 2002-23178

SUMMARY OF THE INVENTION

Problems to be Solved by the Invention

As described above, the viewing angle characteristics of VA mode are improved by using MVA mode or through orientation division such as PSA or the like, but these create new problems, such as transmittance being decreased or new steps being added.

Meanwhile, IPS mode and FFS mode require an alignment treatment, such as rubbing, for setting the orientation direction, and it is difficult to perform this treatment uniformly, especially on large-sized substrates, which makes the device susceptible to displays with uneven brightness.

The present invention takes into consideration the above-mentioned situation, and an object thereof is to provide a liquid crystal display device having excellent display characteristics when using a display mode that uses a vertical electric field and a horizontal electric field.

Means for Solving the Problems

The inventors of the present invention have focused on a configuration of a liquid crystal display device having a liquid crystal layer with liquid crystal molecules that are initially vertically oriented and have a negative dielectric anisotropy. Three types of electrodes are provided within a liquid crystal display device by providing a plate shaped first common electrode on one substrate and providing a pixel electrode on a different layer of the same substrate with an insulating layer therebetween, and providing a second common electrode on another substrate facing the substrate with a liquid crystal layer therebetween.

Black display is obtained by applying a voltage between the pixel electrode and the second common electrode and between the first common electrode and the second common electrode to generate a vertical electric field (electric field formed in the thickness direction of the liquid crystal layer) within the liquid crystal layer, and by horizontally orienting the liquid crystal molecules to the substrate surfaces. Furthermore, while the above mentioned voltage is being applied, it was found out that white display can be obtained by applying voltage between the pixel electrode and the first common electrode to form a horizontal electric field (fringe electric field) in the liquid crystal layer while the voltage is applied.

The inventors of the present invention have also found that it is possible to set the direction of liquid crystal molecules when showing a black display image without a special alignment treatment such as a rubbing treatment by providing a linear liquid crystal orientation control structure on the second substrate. "The direction of the liquid crystal molecules" is the long axes direction of the liquid crystal molecules when the substrate is seen from a plan view.

One aspect of the present invention is a liquid crystal display device including: a first substrate having a plate-shaped first common electrode, and a pixel electrode that is provided in a separate layer from the first common electrode with an insulating film therebetween; a second substrate facing the first substrate; and a liquid crystal layer sandwiched between the first substrate and the second substrate, the liquid crystal layer including liquid crystal molecules that have a negative dielectric anisotropy, wherein the second substrate has a second common electrode with a liquid crystal orientation control structure that is linear in a plan view, and wherein the pixel electrode has a comb-shaped structure (hereinafter, referred to as the first liquid crystal display device of the present invention).

As for the configuration of the first liquid crystal display device of the present invention, as long as these type of components are necessary, other components that are usually used in liquid crystal display devices can be used as appropriate.

The liquid crystal layer above includes liquid crystal molecules having a negative dielectric anisotropy. The liquid crystal molecules have characteristics in which the liquid crystal molecules tilt in a direction perpendicular to the direction of the electric field when voltage is applied thereto.

The first common electrode and the second common electrode are respectively supplied with different sized common potentials. This causes a difference in potential between the second common electrode and the first common electrode, thereby causing a vertical electric field to occur.

The first substrate has a plate-shaped first common electrode, and a pixel electrode provided in a separate layer from the first common electrode via an insulating film. The pixel electrode has a comb-shaped structure. This makes it possible to generate a horizontal electric field (fringe electric field) between the first common electrode and the pixel electrode. The comb-shaped structure above is namely a structure in which a plurality of slits are formed in the pixel electrode. Specific examples of the comb-shaped structure are (i) one end of the slit is open and the other end is closed, and (ii) both ends of the slit are closed. It is preferable that a width of the slits be 5 to 30 μm. If adopting the aspect in (i) for the comb-shaped structure, the first substrate may include a third common electrode that faces the pixel electrode. This makes it possible to generate a horizontal field not only between the pixel electrode and the first common electrode, but also between the pixel electrode and the third common electrode.

The second substrate has a second common electrode, and a liquid crystal orientation control structure that is linear in a plan view. The liquid crystal orientation control structure makes it possible to set the orientation direction of the liquid crystal molecules when showing a black display image. Specific examples of the liquid crystal orientation control structure include (a) slits formed in the second common electrode, and (b) dielectric projections provided on a surface of the second common electrode adjacent to the liquid crystal layer. The liquid crystal orientation control structure has no particular limitations as long as this structure is linear in a plan view and can regulate the orientation of the liquid crystal molecules in a uniform direction. "Linear" includes a shape that has curved or bent portions.

It is preferable that a lengthwise direction of the liquid crystal orientation control structure be at an angle to a lengthwise direction of the comb-shaped structure of the pixel electrode. This makes it possible to make the liquid crystal molecules uniformly horizontally rotate in the same direction with respect to the substrate surfaces when showing a white display image, thereby making it possible to attain favorable response characteristics and a good contrast ratio. It is preferable that the angle be within 0±20° or within 90±20°.

Specific examples of the shape of the second common electrode when slits are provided include (i) one end of the slits being open and the other end being closed, and (ii) both ends of the slits being closed.

When the liquid crystal orientation control structure is (a) slits formed in the second common electrode, then these slits are categorized as (a1) slits having a width of 2 to 5 μm, and (a2) slits having a width larger than 5 μm (preferable 5 to 30 μm). The orientation direction of the liquid crystal molecules will differ depending on the changes in the width of these slits. The slit width indicated in (a1), for example, makes it possible to orient the liquid crystal molecules along the lengthwise direction of the slits when showing a black display image. Meanwhile, the slit width indicated in (a2) makes it possible to orient the liquid crystal molecules orthogonal to the lengthwise direction of the slits when showing a black display image. Accordingly, when adopting the aspect in (a1), it is preferable that a lengthwise direction of the slits formed in the second common electrode be within a 90°±20° angle to a lengthwise direction of slits formed in the pixel electrode, and when adopting the aspect in (a2), it is preferable that a lengthwise direction of the slits formed in the second common electrode be within a 0°±20° angle to slits formed in the pixel electrode. Furthermore, when adopting the aspect in (a1), it is preferable that a width of a comb-shaped structure of the second common electrode be 2 to 5 μm, and when adopting the aspect in (a2), it is preferable that a width of a comb-shaped structure of the second common electrode be greater than 5 μm (preferably 5 to 30 μm).

When the liquid crystal orientation control structure is (b) dielectric projections provided on a surface of the second common electrode adjacent to the liquid crystal layer, these structures are categorized as (b1) dielectric projections having a width of 2 to 5 μm, and (b2) dielectric projections having a width greater than 5 μm (preferable 5 to 30 μm). The orientation direction of the liquid crystal molecules will differ depending on the changes in the width of these dielectric projections. By using the width shown in (b1) for the liquid crystal orientation control structure, for example, it is possible to orient the liquid crystal molecules along the lengthwise direction of the dielectric projections when showing a black display image. Meanwhile, by using the width shown in (b2) for the liquid crystal orientation control structure, for example, it is possible to orient the liquid crystal molecules orthogonal to the lengthwise direction of the dielectric projections when showing a black display image. Accordingly, when adopting the aspect in (b1), it is preferable that a lengthwise direction of the dielectric projections be within a 90°±20° angle to a lengthwise direction of slits formed in the pixel electrode, and when adopting the aspect in (b2), it is preferable that a lengthwise direction of the dielectric projections be within a 0°±20° angle to slits formed in the pixel electrode. Furthermore, when adopting the aspect in (b1), it is preferable that the width between adjacent dielectric projections be 2 to 5 μm, and when adopting the aspect in (b2), it is preferable that the width between adjacent dielectric projections be greater than 5 μm (preferably 5 to 40 μm).

It is preferable that the liquid crystal display device include a polymer layer for controlling orientation of the liquid crystal molecules formed on at least one of the first substrate and the second substrate. It is preferable that the polymer layer be formed by monomers added into the liquid crystal layer being polymerized. By providing this type of polymer layer (PSA layer), it is possible to stabilize the orientation of the liquid crystal molecules.

It is preferable that the liquid crystal display device have a first control circuit that supplies an electric signal to the first common electrode, and a second control circuit that supplies an electric signal to the second common electrode, and that a difference in potential between the electric signal supplied to the first common electrode and the electric signal supplied to the second common electrode be 10 to 20V.

With this difference in potential, it is possible to horizontally rotate the liquid crystal molecules when showing a black display image while the liquid crystal molecules are oriented approximately horizontal to the substrate surfaces, thereby making it possible to attain a favorable contrast ratio.

The first control circuit and the second control circuit may be a configuration (DC power supply) that applies a fixed voltage for a uniform period of time or a configuration (AC power supply) that switches polarity after a fixed voltage has been applied for a uniform period of time. When using an AC power supply, it is preferable that only the polarity change and the absolute value remains the same, in consideration of symmetry. Different power supplies may be used for the first control circuit and the second control circuit, or an AC power supply outside the panel may be used.

The technical features above can each exhibit the above-mentioned effects on their own.

Another aspect of the present invention is a liquid crystal display device including: a first substrate having a plate-shaped first common electrode, and a pixel electrode that is provided in a separate layer from the first common electrode with an insulating film therebetween, the pixel electrode having a comb-shaped structure; a second substrate facing the first substrate, the second substrate having a second common electrode; a liquid crystal layer sandwiched between the first substrate and the second substrate, the liquid crystal layer including liquid crystal molecules that have a negative dielectric anisotropy; a first control circuit that supplies an electric signal to the first common electrode; and a second control circuit that supplies an electric signal to the second common electrode, wherein a difference in potential between the electric signal supplied to the first common electrode and the electric signal supplied to the second common electrode is 10 to 20V (hereinafter, referred to as the second liquid crystal display device of the present invention).

As for the configuration of the second liquid crystal display device of the present invention, as long as these type of components are necessary, other components that are usually used in liquid crystal display devices can be used as appropriate.

It is preferable that the liquid crystal display device further include a third control circuit that supplies a higher frequency alternating signal to the second common electrode, and a fourth control circuit that supplies a lower frequency alternating signal to the pixel electrode.

"Higher frequency alternating signal" means an alternating signal with a higher frequency than the "lower frequency alternating signal." In a similar manner, "lower frequency alternating signal" means an alternating signal with a lower frequency than the "higher frequency alternating signal."

The frequency of the alternating signal supplied to the second common electrode is configured to be higher than the frequency of the alternating signal supplied to the pixel electrode, thereby making it possible for the difference in potential to be 0, or to almost completely eliminate moments where the difference in potential becomes very large. This allows for a constant voltage to be regularly maintained, thereby making it possible to attain excellent display characteristics with little display unevenness.

The technical features above can each exhibit the above-mentioned effects on their own.

Another aspect of the present invention is a liquid crystal display device including: a first substrate having a plate-shaped first common electrode, and a pixel electrode that is provided in a separate layer from the first common electrode with an insulating film therebetween, the pixel electrode having a comb-shaped structure; a second substrate facing the first substrate, the second substrate having a second common electrode; a liquid crystal layer sandwiched between the first substrate and the second substrate, the liquid crystal layer including liquid crystal molecules that have a negative dielectric anisotropy; a third control circuit that supplies higher frequency alternating current signals to the second common electrode; and a fourth control circuit that supplies lower frequency alternating current signals to the pixel electrode (hereinafter, referred to as a third liquid crystal display device of the present invention).

As for the configuration of the third liquid crystal display device of the present invention, as long as these type of components are necessary, other components that are usually used in liquid crystal display devices can be used as appropriate.

It is preferable that the above-mentioned display device further include a backlight unit; a backlight unit control circuit; a fifth control circuit that supplies alternating current signals to the second common electrode; a sixth control circuit that supplies alternating current signals to the pixel electrode, the fifth control circuit and the sixth control circuit supplying alternating current signals of the same frequency; and a control circuit that turns OFF the backlight unit in accordance with positive and negative switching of the alternating current signals by the fifth control circuit.

Alternating signals with the same frequency can be realized by control based on the same clock signals.

When the frequency of the alternating signals supplied to the pixel electrode is made the same as the frequency of the alternating signals supplied to the second common electrode, there are moments during switching of the polarity of the alternating current voltage when the liquid crystal molecules are unable to maintain a horizontal orientation, which could cause light leakage when showing a black display image. In order to suppress the amount of power consumption, however, the backlight unit is turned OFF in accordance with the positive and negative switching of the alternating current signals, thereby making it possible to eliminate light leakage when showing a black display image and to attain a favorable black display.

The technical features above can each exhibit the above-mentioned effects on their own.

Another aspect of the present invention is a liquid crystal display device including: a first substrate having a plate-shaped first common electrode, and a pixel electrode that is provided in a separate layer from the first common electrode with an insulating film therebetween, the pixel electrode having a comb-shaped structure; a second substrate facing the first substrate, the second substrate having a second common electrode; a liquid crystal layer sandwiched between the first substrate and the second substrate, the liquid crystal layer including liquid crystal molecules that have a negative dielectric anisotropy; a backlight unit; a backlight unit control circuit; a fifth control circuit that supplies alternating current signals to the second common electrode; a sixth control circuit that supplies alternating current signals to the pixel electrode, the fifth control circuit and the sixth control circuit supplying alternating current signals of the same frequency; and a control circuit that turns OFF the backlight unit in accordance with positive and negative switching of the alternating current signals by the fifth control circuit (hereinafter, referred to as a fourth liquid crystal display device of the present invention).

As for the configuration of the fourth liquid crystal display device of the present invention, as long as these type of components are necessary, other components that are usually used in liquid crystal display devices can be used as appropriate.

The first and the second substrate provided in the first to fourth liquid crystal display devices of the present invention are a pair of substrates that sandwich the liquid crystal layer and are insulating substrates made of glass or resin as the main component thereof, and have wiring lines, electrodes, color filters, or the like on the respective insulating substrates.

It is preferable that the first substrate be an active matrix substrate having active elements.

Effects of the Invention

According to the present invention, a liquid crystal display device that has a display mode using vertical and horizontal electric fields and that has excellent display characteristics can be obtained.

DETAILED DESCRIPTION OF EMBODIMENTS

Embodiments are shown below and the present invention is described in further detail with reference to the drawings, but the present invention is not limited to these embodiments.

In the embodiments below, a pixel represents a display unit forming a portion of a display screen, and one pixel is constituted of a plurality of sub-pixels. One pixel electrode and one color filter are normally provided for each sub-pixel, but this may be modified as appropriate in accordance with the driving method.

Embodiment 1

Figure 1:
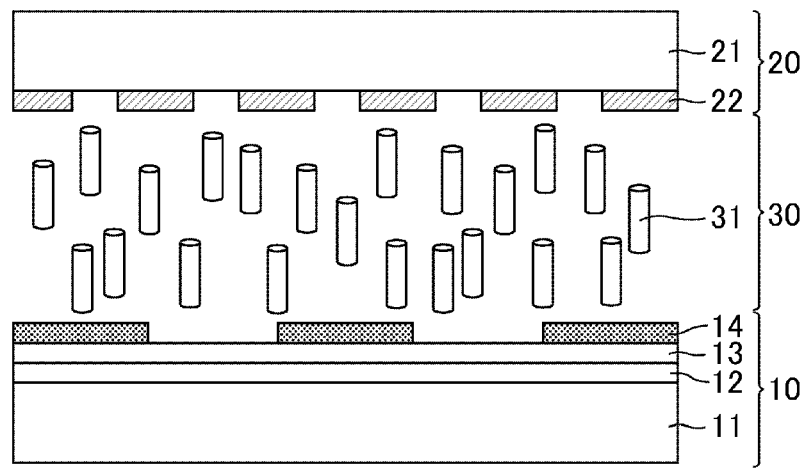
FIG. 1 is a schematic cross-sectional view along the line A-B of the liquid crystal display device in FIG. 2 when a voltage is not applied.
Figure 2:
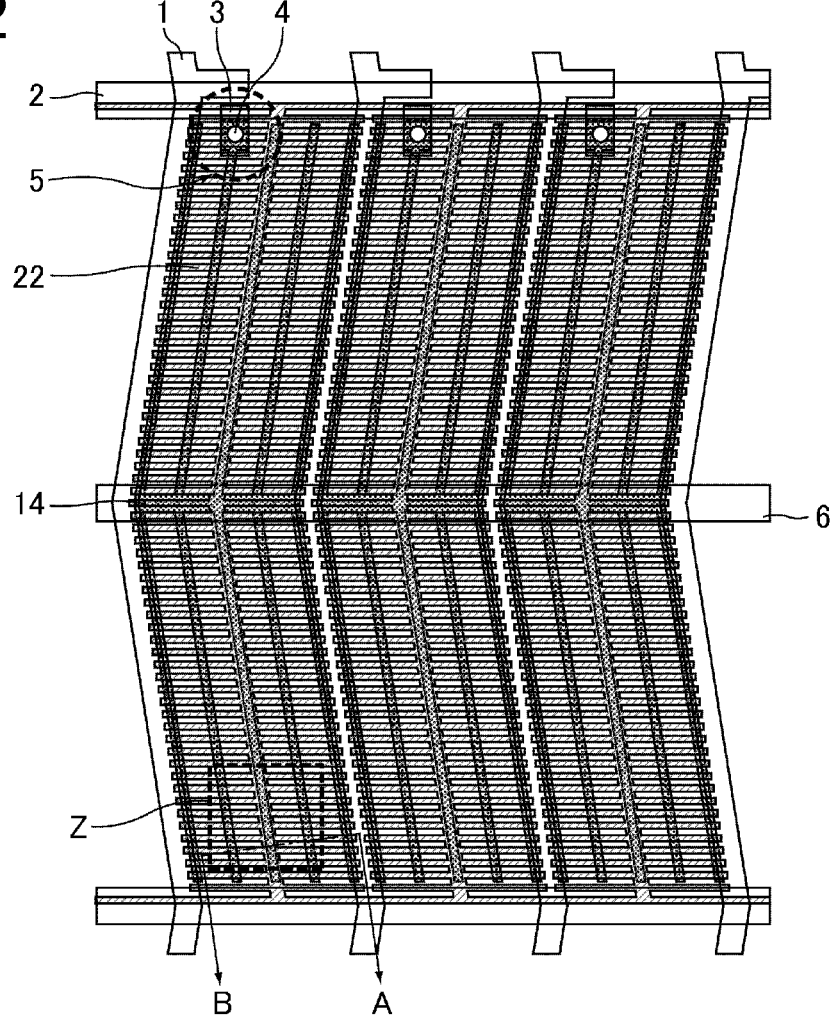
FIG. 2 is a schematic plan view of one pixel of the liquid crystal display device according to Embodiment 1.

FIG. 1 is a schematic cross-sectional view along the line A-B of the liquid crystal display device in FIG. 2 when a voltage is not being applied. The liquid crystal display device of Embodiment 1 has a first substrate 10, a second substrate 20, and a liquid crystal layer 30 sandwiched between the first substrate 10 and the second substrate 20. The liquid crystal layer 30 has liquid crystal molecules 31 having a negative dielectric anisotropy. The first substrate 10 includes a support substrate 11, thin-film transistors (TFTs), scan signal lines, data signal lines 1, a first common electrode 12, pixel electrodes 14, an insulating film 13 that electrically isolates the first common electrode 12 from the pixel electrodes 14, and a vertical alignment film. The second substrate 20 is provided with a support substrate 21, a second common electrode 22, a color filter, a black matrix, and an alignment film.

Figure 3:
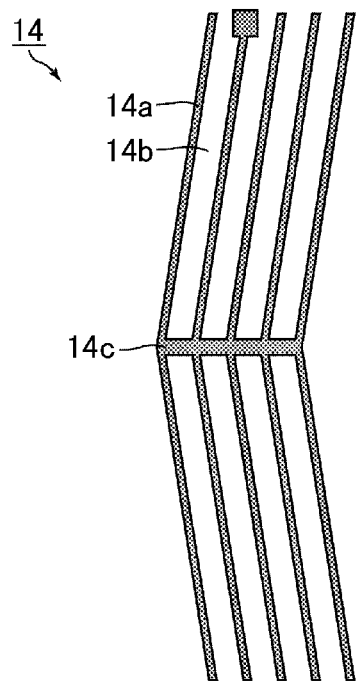
FIG. 3 is a schematic plan view showing one sub-pixel cell forming a portion of a pixel, and only the pixel electrode is shown.
Figure 4:
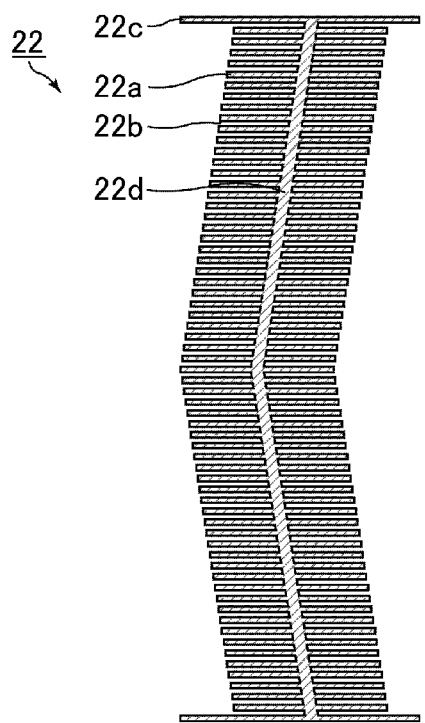
FIG. 4 is a schematic plan view showing one sub-pixel cell forming a portion of a pixel, and only the second common electrode is shown.
Figure 5:
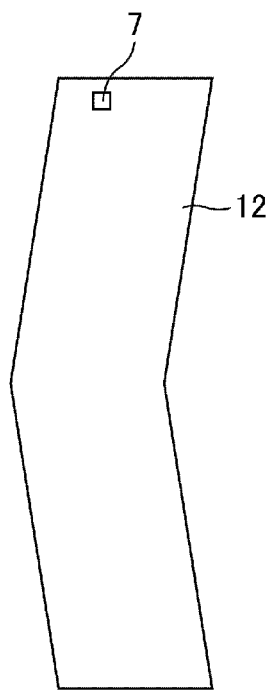
FIG. 5 is a schematic plan view of only the first common electrode.
Figure 5:
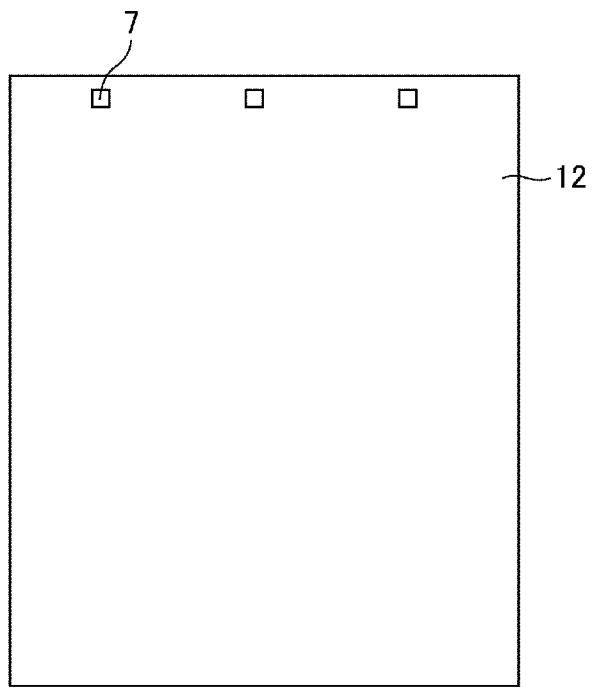
Figure 6:
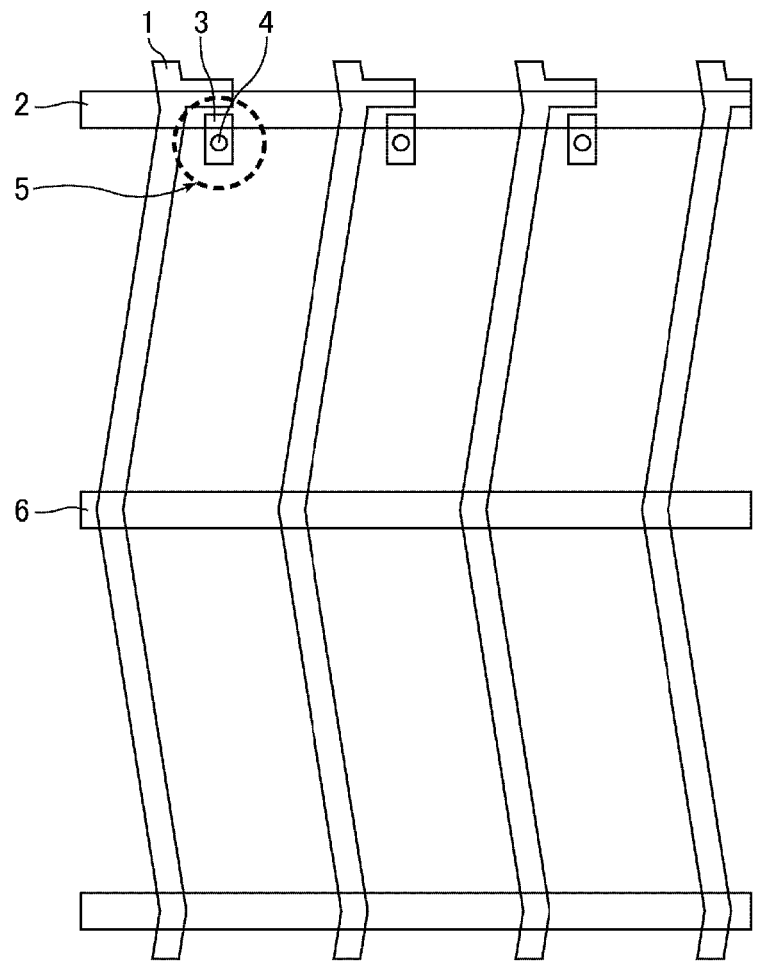
FIG. 6 is a schematic plan view of one pixel, and only the pixel electrode, first common electrode, and second common electrode are shown.

FIG. 2 is a schematic plan view of one pixel of the liquid crystal display device according to Embodiment 1. FIGS. 3 and 4 are schematic plan views showing one sub-pixel cell forming a portion of a pixel. FIG. 3 shows only a pixel electrode, and FIG. 4 shows only the second common electrode. FIG. 5 is a schematic plan view of only the first common electrode. FIG. 5(a) is a schematic plan view of when the first common electrode is formed corresponding to each sub-pixel forming a portion of a pixel, and FIG. 5(b) is a schematic plan view of when the first common electrode straddles a plurality of pixels. FIG. 6 is a schematic plan view of one pixel of the liquid crystal display device according to Embodiment 1, and wiring lines and the like are also shown in this figure.

As shown in FIGS. 2 and 6, the data signal lines 1 extend in the vertical direction of the liquid crystal display panel, and scan signal lines 2 extend in the horizontal direction of the liquid crystal display panel. One of the pixel electrodes 14 is provided in each region (sub-pixel) where the data signal lines and scan signal lines intersect each other, in an area surrounded by these lines. As shown in FIG. 2, each sub-pixel has a combined shape of two substantially rectangular shapes (parallelogram shapes) that are symmetrical to each other with the extension direction of the scan signal lines 2 as the axis. The data signal lines 1 extend in the vertical direction of the liquid crystal display panel while bending at the center and top/bottom of each sub-pixel along the vertical sides of the sub-pixels. A common wiring line 6 or a storage capacitance wiring line 6 is provided so as to go across the center of the sub-pixels.

The TFT (thin film transistor) 5 is provided in the vicinity of each connecting point of the data signal lines 1 and the scan signal lines 2. Respective portions of the data signal line 1, the scan signal line 2, a drain lead out wiring line 3, and the semiconductor layer form the TFT 5. The TFT 5 functions as a switching element. The pixel electrode 14 is connected to the drain lead out wiring line 3, which extends from the TFT 5, through a contact 4 disposed in the insulating film. When scan signals supplied by the scan signal line 2 turn the TFT ON, the semiconductor layer becomes conductive, and data signals supplied through the data signal line 1 are written to the pixel electrode 14.

As shown in FIGS. 2 and 3, the pixel electrode 14 is constituted of a main axis part 14c of the pixel electrode and a plurality of comb-shaped parts 14a extending both upwards and downwards from the main axis part 14c of the pixel electrode. It can also be said that slits 14b are defined between the respective comb-shaped parts 14a of the pixel electrode. The extension direction of the main axis part 14c of the pixel electrode is at a 70 to 90° angle to the extension direction of the comb-shaped parts 14a. This angle makes it possible to vary the orientation state of the liquid crystal molecules at the top and bottom of a single sub-pixel when showing a white display image, thereby allowing for an improvement in viewing angle characteristics. It is preferable that the width of the comb shaped parts 14a be 2 to 5 µm, and that the width of the slits 14b be 5 to 20 µm.

As shown in FIGS. 2 and 4, the second common electrode 22 is constituted of a connection part 22c that extends in the horizontal direction, a main axis part 22d that extends in the vertical direction, and a plurality of comb-shaped parts 22a that extend in both the left and the right direction from the main axis part 22d. It could also be said that micro-slits 22b (liquid crystal orientation control structure) are defined between the respective comb-shaped parts 22a of the second common electrode. The second common electrode 22 is electrically connected to the second common electrode 22 of the adjacent sub-pixel via the connection part 22c. The main axis part 22d of the second common electrode extends so as to vertically traverse the center of the sub-pixel and bends so as to be parallel to the comb-shaped parts 14a of the pixel electrode. The comb-shaped parts 22a of the second common electrode extend to the outer edge of the sub-pixel.

It is preferable that the width of the comb shaped parts 22a of the second common electrode be 2 to 5 µm, and that the width of the micro-slits 22b be 2 to 5 µm. When there is a vertical electrical field, this slit width causes the liquid crystal molecules to orient horizontally to the substrate and to orient along the lengthwise direction of the micro-slits 22b.

The lengthwise direction of the micro-slits 22b formed in the second common electrode is within a 90°±20° angle to the lengthwise direction of the slits 14b in the pixel electrode. In Embodiment 1, the liquid crystal molecules 31 orient along the lengthwise direction of the micro-slits 22b formed in the second common electrode when showing a black display image, and thus the direction of the liquid crystal molecules is within a 90°±20° angle to the lengthwise direction of the slits 14b formed in the pixel electrode. When showing a white display image, a horizontal electric field occurs in a direction perpendicular to the lengthwise direction of the slits 14b formed in the pixel electrode, or namely, a direction within a 0°±20° angle to the direction of the liquid crystal molecules 31 when showing a black display image. The liquid crystal molecules rotate horizontally towards the direction that is perpendicular to this horizontal electric field. In Embodiment 1, the polarizing axis of the polarizing plate of either the first substrate or the second substrate matches the lengthwise direction of the micro-slits 22b formed in the second common electrode.

The first common electrode 12 is formed in a plate shape on the first substrate. The pixel electrode 14 is formed in a separate layer from the first common electrode 12 through the insulating film. As shown in FIG. 5(a), the first common electrode 12 may be formed for each sub-pixel forming a portion of a pixel, or as shown in FIG. 5(b), may be formed so as to widely straddle a plurality of pixels. An opening 7 for ensuring a connection path of the TFT 5 and the pixel electrode 14 may also be provided. When seen in a plan view, it is preferable that the first common electrode 12 overlap the second common electrode 22, and that the first common electrode 12 be formed from the terminal of the comb-shaped parts 22a of the second common electrode to the outside (in other words, so as to cover the entirety of the second common electrode 22). With this configuration, it is possible for the entirety of the region where the second common electrode 22 is formed to be open and for transmittance to be improved.

The driving principle of the liquid crystal display device of Embodiment 1 will be described in detail below.

First, a state in which voltage is not being applied will be explained using FIG. 1. "Voltage not being applied" means a state in which voltage is not applied among the first common electrode 12, the second common electrode 22, and the pixel electrode 14. The liquid crystal molecules 31 are oriented perpendicularly to the surface of the substrates 10 and 20.

Figure 7:
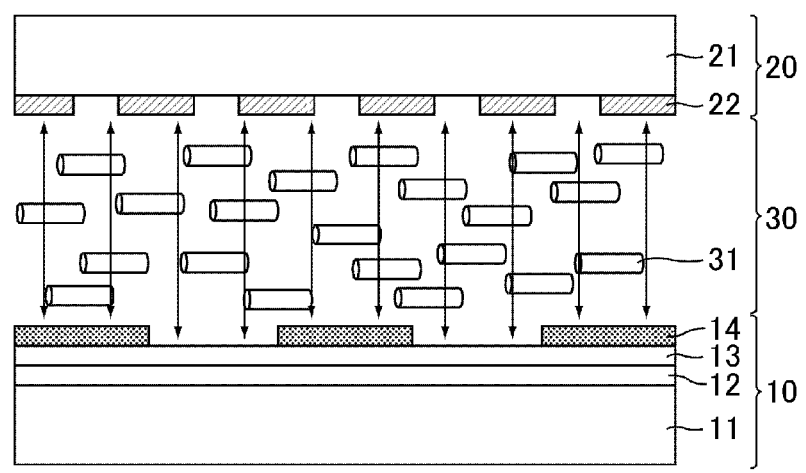
FIG. 7 is a schematic cross-sectional view along the line A-B of the liquid crystal display device in FIG. 2 when a vertical electric field is occurring.
Figure 8:
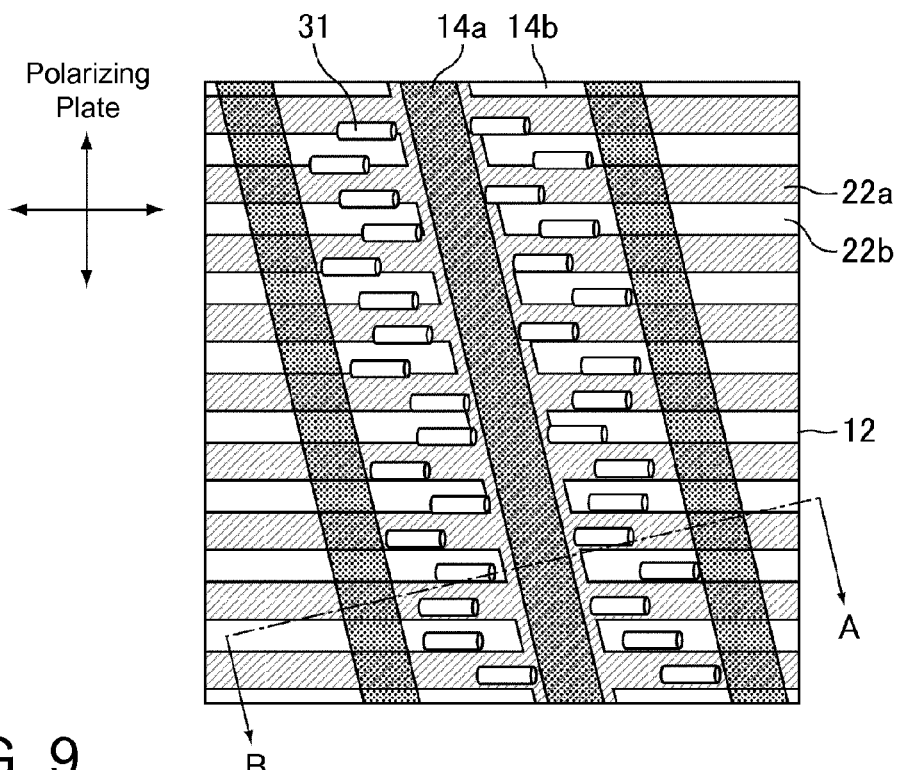
FIG. 8 is an enlarged schematic plan view of a portion surrounded by Z in FIG. 2 when a vertical electric field is occurring.

Next, black display will be explained. FIG. 7 is a schematic cross-sectional view along the line A-B of the liquid crystal display device in FIG. 2 when a vertical electric field is occurring. FIG. 8 is an enlarged schematic plan view of a portion surrounded by Z in FIG. 2 when a vertical electric field is occurring. In FIG. 7, the arrows indicate the direction of the electric field. When showing a black display image, voltage is applied between the second common electrode 22 and the first common electrode 12, or between the second common electrode 22 and the pixel electrode 14, to cause a vertical electric field that is substantially perpendicular to the substrate surface to occur in the liquid crystal layer. In Embodiment 1, micro-slits are formed in the second common electrode 22, and thus the actual vertical electric field is slightly tilted, rather than completely perpendicular, with respect to the substrate.

The liquid crystal molecules 31 have a negative dielectric anisotropy; therefore, the liquid crystal molecules 31 orient in a direction that is orthogonal to the direction of the vertical electric field, which results in a horizontal orientation with respect to the substrates 10 and 20. In Embodiment 1, the liquid crystal molecules 31 collide with each other due to the narrow width of the slits formed in the second common electrode 22, and as shown in FIG. 8, the liquid crystal molecules 31 are oriented along the lengthwise direction of the micro-slits formed in the second common electrode 22. Light from the backlight is blocked and black display is performed by arranging the respective polarizing plates such that the polarizing axis of the polarizing plate of either the first substrate 10 or the second substrate 20 matches the lengthwise direction of the micro-slits formed in the second common electrode 22, and such that the polarizing axes of these polarizing plates are orthogonal to each other.

Figure 9:
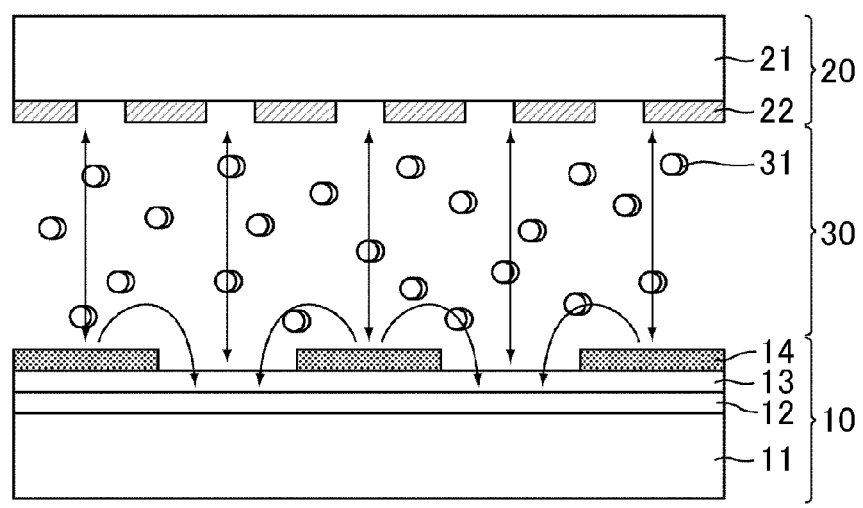
FIG. 9 is a schematic cross-sectional view along the line A-B of the liquid crystal display device in FIG. 2 when a horizontal electric field is occurring.
Figure 10:
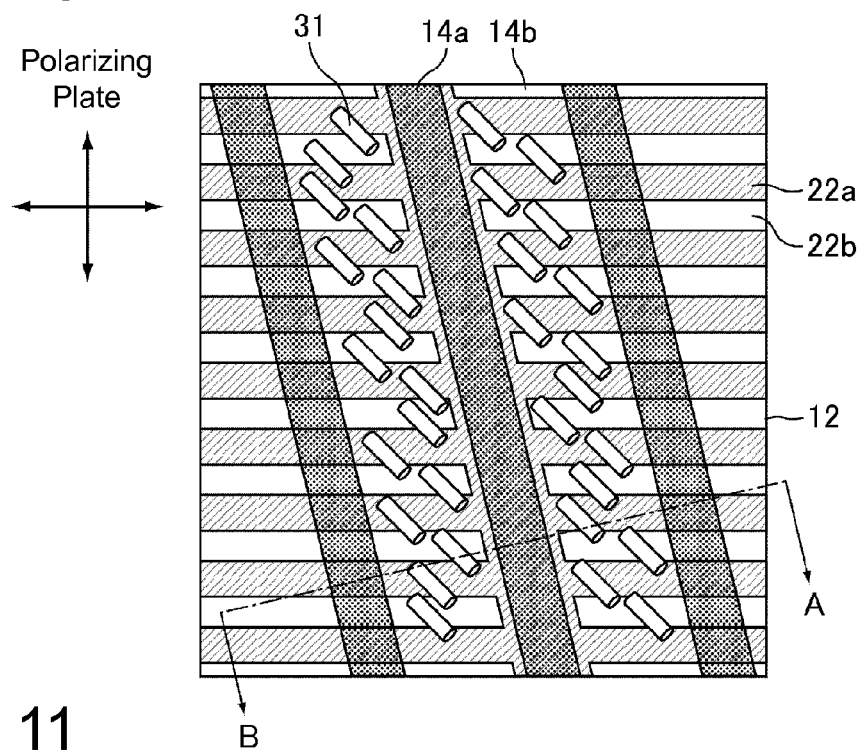
FIG. 10 is an enlarged schematic plan view of a portion surrounded by Z in FIG. 2 when a horizontal electric field is occurring.

Next, white display will be explained. FIG. 9 is a schematic cross-sectional view along the line A-B of the liquid crystal display device in FIG. 2 when a horizontal electric field is occurring. FIG. 10 is an enlarged schematic plan view of a portion surrounded by Z in FIG. 2 when a horizontal electric field is occurring. In FIG. 9, the arrows indicate the direction of the electric field. When showing a white display image, a voltage is applied between the pixel electrode 14 and the first common electrode 12 while a voltage is applied between the second common electrode 22 and the first common electrode 12 or the second common electrode 22 and the pixel electrode 14, thereby causing a horizontal electric field to be generated in addition to the vertical electric field inside the liquid crystal layer 30. A potential that is sufficient enough to rotate the liquid crystal molecules horizontally is supplied to the pixel electrode 14 in accordance with the timing of the switching of the TFT. The liquid crystal molecules 31 attempt to orient in the direction perpendicular to the horizontal electric field, which causes the liquid crystal molecules 31 to rotate while in an in orientation state that is horizontal with respect to the substrate surfaces. If this state is seen in a plan view, then as shown in FIG. 10, the direction of the liquid crystal molecules 31 is at an angle to the polarizing axis of the polarizing plate, thus allowing light from the backlight to pass through, which enables white display.

As described above, while the vertical electric field is occurring, the horizontal electric field is also caused to occur, thereby making it possible to perform display switching of the liquid crystal display device. A vertical alignment film is provided on each substrate surface in Embodiment 1, but an alignment treatment such as rubbing, photoalignment, or the like is not necessary. One characteristic of the present embodiment is that it is possible to attain favorable display characteristics without an alignment treatment.

The material of the respective members and a method of manufacturing will be described below.

For the material of the support substrates 11 and 21, a transparent material such as glass or plastic may be used as appropriate. A circularly polarizing plate or a linearly polarizing plate can be used for the polarizing plates. It is preferable that the alignment film be a vertical alignment film, and the alignment film may be an organic alignment film or an inorganic alignment film.

The first common electrode 12, the second common electrode 22, and the pixel electrode 14 can be patterned by depositing a transparent conductive film such as indium tin oxide (ITO), indium zinc oxide (IZO), zinc oxide (ZnO), tin oxide (SnO), or an alloy of these by sputtering a single layer or multiple layers, for example, and then using photolithography or the like. The slits formed in the pixel electrode 14 and the micro-slits formed in the second common electrode 22 can be formed at the same time during patterning.

The first substrate 10 and the second substrate 20 that have been fabricated in this manner have a plurality of columnar spacers made of an insulating material provided on one of the substrates, and then a sealing material is used to bond the substrates together. The liquid crystal layer 30 is formed between the first substrate 10 and the second substrate 20, but when using the drip method, the liquid crystal material is dripped before the bonding of the substrates, and when using a vacuum injection method, the liquid crystal material is injected after the substrates have been bonded. The polarizing plates, phase difference films, and the like are attached to the surface of the each of the substrates opposite to the liquid crystal layer 30 side, thereby completing the liquid crystal display device. Furthermore, mounting a gate driver, source driver, display circuit, or the like on the liquid crystal display device and combining this with a backlight device or the like forms a liquid crystal display device that is fit for purpose.

The structure of the liquid crystal display panel of Embodiment 1 can be used in a scanning electron microscope (SEM) for verifying and measuring, for example.

Figure 11:
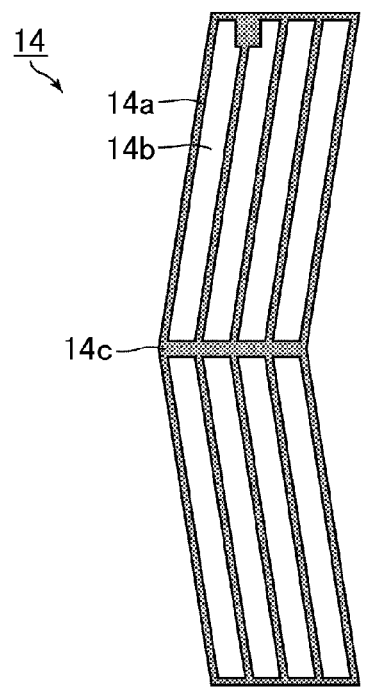
FIG. 11 is a schematic plan view of a pixel electrode in a liquid crystal display device according to Modification Example 1.

Modification Example 1 of Embodiment 1 includes an aspect where the pixel electrode has a structure in which both ends of the slits are closed. FIG. 11 is a schematic plan view of a pixel electrode in a liquid crystal display device according to Modification Example 1. As shown in FIG. 11, both ends of the slits 14b are closed by the pixel electrode 14 body. Modification Example 1 can achieve similar effects to those described above.

Figure 12:
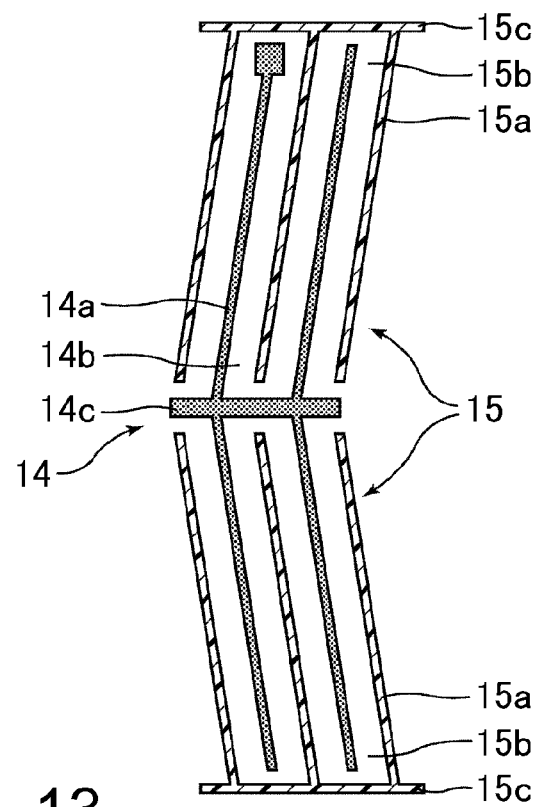
FIG. 12 is a schematic plan view of a pixel electrode in a liquid crystal display device according to Modification Example 2.
Figure 13:
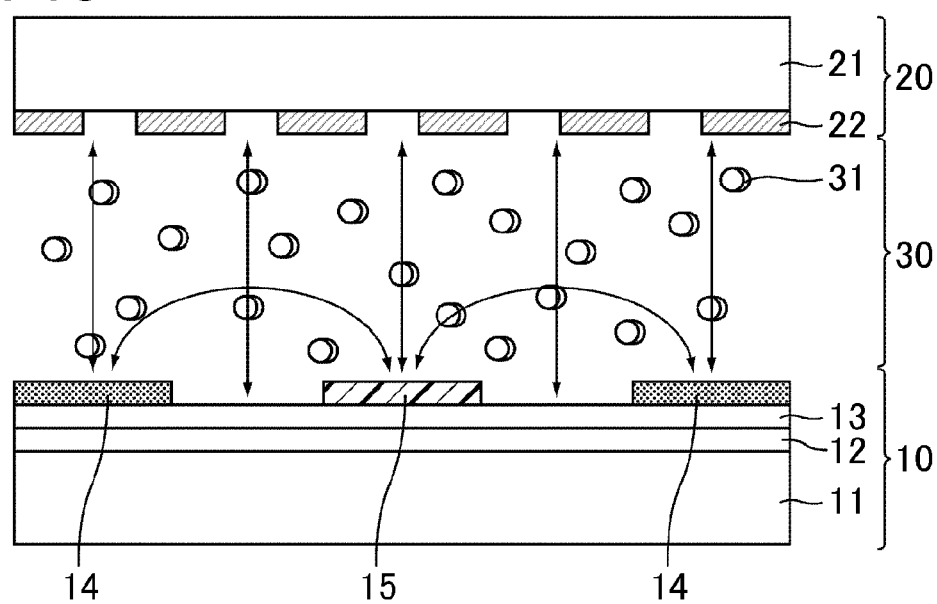
FIG. 13 is a schematic cross-sectional view of the liquid crystal display device of Modification Example 2 when a horizontal electric field is occurring.

Modification Example 2 of Embodiment 1 includes an aspect where comb-shaped electrodes that face the pixel electrode are further provided. FIG. 12 is a schematic plan view of a pixel electrode of the liquid crystal display device according to Modification Example 2, and FIG. 13 is a schematic cross-sectional view of the liquid crystal display device according to Modification Example 2 when a horizontal electric field is occurring. In FIG. 13, the arrows indicate the direction of the electric field. As shown in FIG. 12, Modification Example 2 has the pixel electrode 14 having a structure in which one end of the slits is open and the other end is closed, and a third common electrode 15 having a structure in which one end of the slits are open and the other end of the slits is closed. Two of the third common electrodes 15 are provided so as to sandwich the pixel electrode 14 in a plan view, and comb-shaped parts 15a of the third common electrodes 15 are arranged so as to engage the comb-shaped parts 14a of the pixel electrode with a uniform gap therebetween. The same potential signal is supplied to each of the third common electrodes 15. The material, method of manufacturing, and the like of the third common electrode is the same as the pixel electrode described above.

The driving principle in Modification Example is similar to Embodiment 1 when no voltage is applied and when showing a black display image. When showing a white display image, a potential that causes the liquid crystal molecules to rotate horizontally is supplied to the pixel electrode 14 in accordance with the switching of the TFT connected to the pixel electrode 14, thereby changing the orientation of the liquid crystal positioned between the third common electrodes 15, which have a common potential.

As shown in FIG. 13, by supplying different potentials to the pixel electrode 14 and the third common electrode 15, a difference in potential occurs between the pixel electrode 14 and the third common electrode 15, which causes a horizontal electric field to occur within the liquid crystal layer 30. The liquid crystal molecules 31 attempt to orient in the direction perpendicular to the horizontal electric field, which causes the liquid crystal molecules 31 to rotate while in an orientation state that is horizontal with respect to the substrate surfaces. When this state is seen in a plan view, the liquid crystal molecules 31 are at an angle to the polarizing axis of the polarizing plate, and thus allow light from the backlight to pass through, which enables white display.

Embodiment 2

Figure 14:
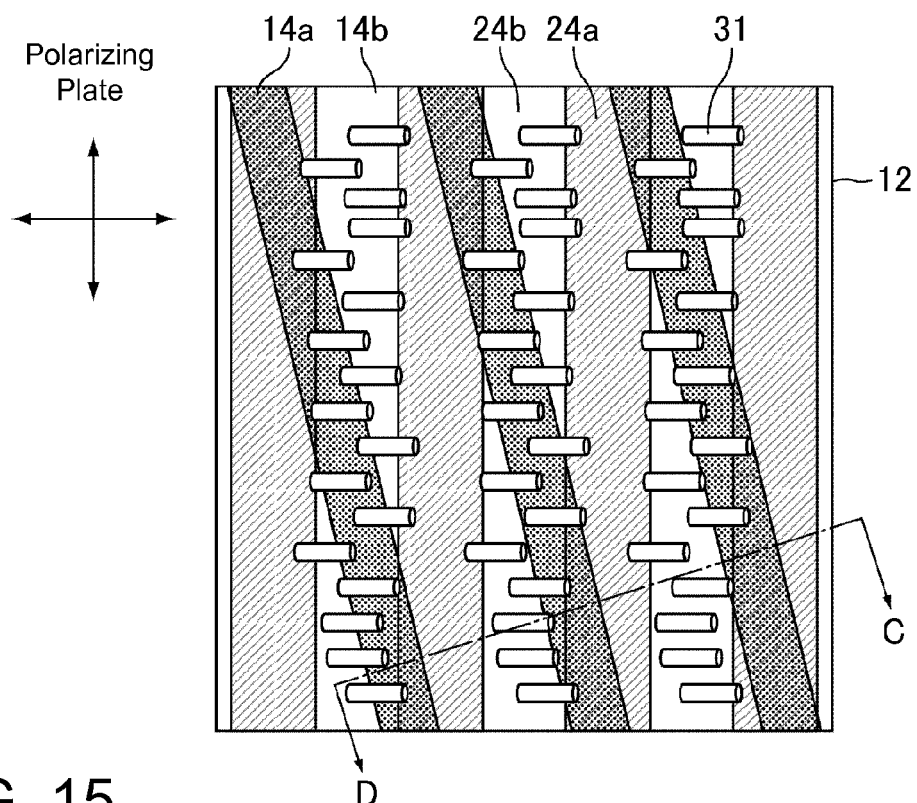
FIG. 14 is a schematic plan view of the liquid crystal display device of Embodiment 2 when a vertical electric field is occurring.

Embodiment 2 is similar to Embodiment 1 except in that slits (liquid crystal orientation control structure) formed in a second common electrode have a width of 5 to 30 μm, instead of being micro-slits, and as shown in FIG. 14, the lengthwise direction of slits 24b formed in the second common electrode within a 0±20° angle to the lengthwise direction of slits 14b formed in the pixel electrode. It is preferable that the width of comb-shaped parts 24a of the second common electrode be 5 to 20 μm.

Below, principles behind the driving of a liquid crystal display device of Embodiment 2 of the present invention will be explained.

When no voltage is being applied, Embodiment 2 is similar to Embodiment 1.

Figure 15:
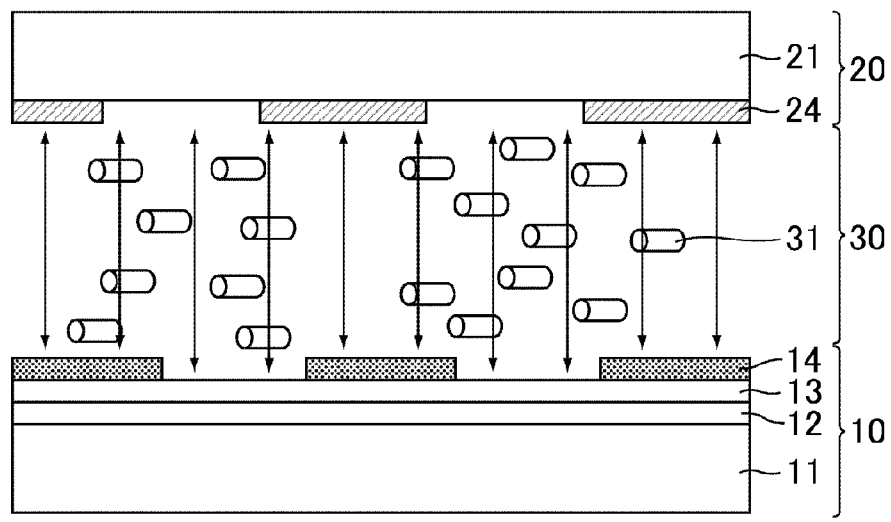
FIG. 15 is a schematic cross-sectional view of the liquid crystal display device along the line C-D in FIG. 14 when a vertical electric field is occurring.

Black display will be explained. FIG. 14 is a schematic plan view of a liquid crystal display device of Embodiment 2 when a vertical electric field is occurring. FIG. 15 is a schematic cross-sectional view along the line C-D of the liquid crystal display device in FIG. 14 when a vertical electric field is occurring. In FIG. 15, the arrows indicate the direction of the electric field. As shown in FIG. 15, when showing a black display image, a voltage is applied between the second common electrode 24 and the first common electrode 12, or between the second common electrode 24 and the pixel electrode 14, thereby causing a vertical electric field that is substantially perpendicular to the substrate surfaces to be generated inside the liquid crystal layer 30. In Embodiment 2, slits are formed in the second common electrode 24; thus, the actual vertical electric field would be slightly tilted, rather than exactly perpendicular to the substrate surfaces 10 and 20.

The liquid crystal molecules 31 have a negative dielectric anisotropy; therefore, the liquid crystal molecules 31 orient in a direction that is orthogonal to the direction of the vertical electric field, which results in a horizontal orientation with respect to the substrates 10 and 20. In Embodiment 2, the slits formed in the second common electrode 24 are wide. Therefore, the liquid crystal molecules do not collide with each other as in Embodiment 1. As shown in FIG. 14, the liquid crystal molecules 31 orient perpendicularly to the lengthwise direction of the slits formed in the second common electrode 24. Light from the backlight is blocked and black display is performed by arranging the respective polarizing plates such that the polarizing axis of the polarizing plate of either the first substrate 10 or the second substrate 20 matches the lengthwise direction of the slits formed in the second common electrode 24, and such that the polarizing axes of these polarizing plates are orthogonal to each other.

Figure 16:
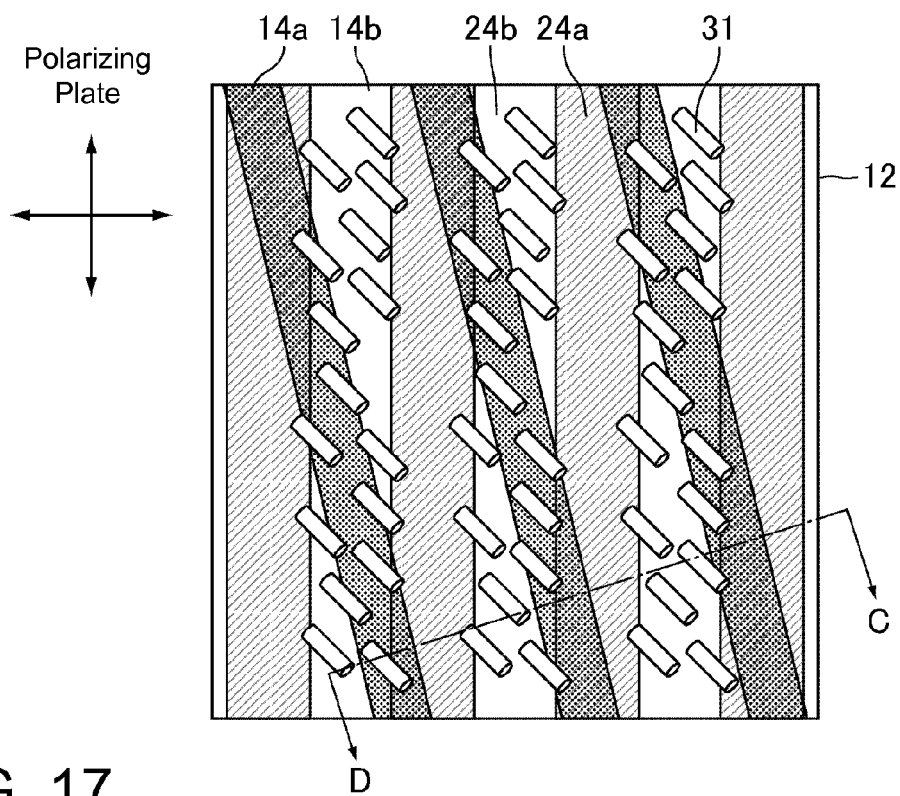
FIG. 16 is a schematic plan view of the liquid crystal display device of Embodiment 2 when a horizontal electric field is occurring.
Figure 17:
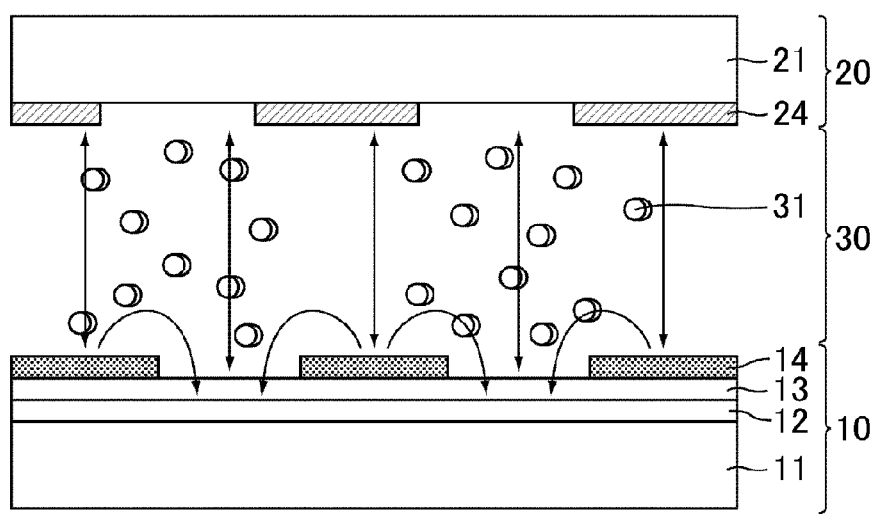
FIG. 17 is a schematic cross-sectional view of the liquid crystal display device along the line C-D in FIG. 16 when a horizontal electric field is occurring.

Next, white display will be explained. FIG. 16 is a schematic plan view of a liquid crystal display device of Embodiment 2 when a horizontal electric field is occurring. FIG. 17 is a schematic cross-sectional view along the line C-D of the liquid crystal display device in FIG. 16 when a horizontal electric field is occurring. In FIG. 17, the arrows indicate the direction of the electric field. When showing a white display image, a voltage is applied between the pixel electrode 14 and the first common electrode 12 while a voltage is applied between the second common electrode 24 and the first common electrode 12 or the second common electrode 24 and the pixel electrode 14, thereby causing a horizontal electric field to be generated in addition to the vertical electric field inside the liquid crystal layer 30. A potential that is sufficient enough to horizontally rotate the liquid crystal molecules 31 is supplied to the pixel electrode 14 in accordance with the timing of the switching of the TFT. The liquid crystal molecules 31 rotate horizontally with respect to the substrate surfaces 10 and 20 as a result of the liquid crystal molecules 31 attempting to be oriented perpendicularly to the horizontal electric field. If this state is seen in a plan view, then as shown in FIG. 16, the liquid crystal molecules 31 are at an angle to the polarizing axis of the polarizing plate, thus allowing light from the backlight to pass through, which enables white display.

As described above, while the vertical electric field is occurring, the horizontal electric field is also caused to occur, thereby making it possible to perform display switching of the liquid crystal display device. In a manner similar to Embodiment 1, a vertical alignment film is disposed on each of the substrate surfaces in Embodiment 2, alignment treatments such as rubbing, photoalignment, or the like are not necessary. One characteristic of the present embodiment is that it is possible to attain favorable display characteristics without an alignment treatment.

Embodiment 3

Figure 18:
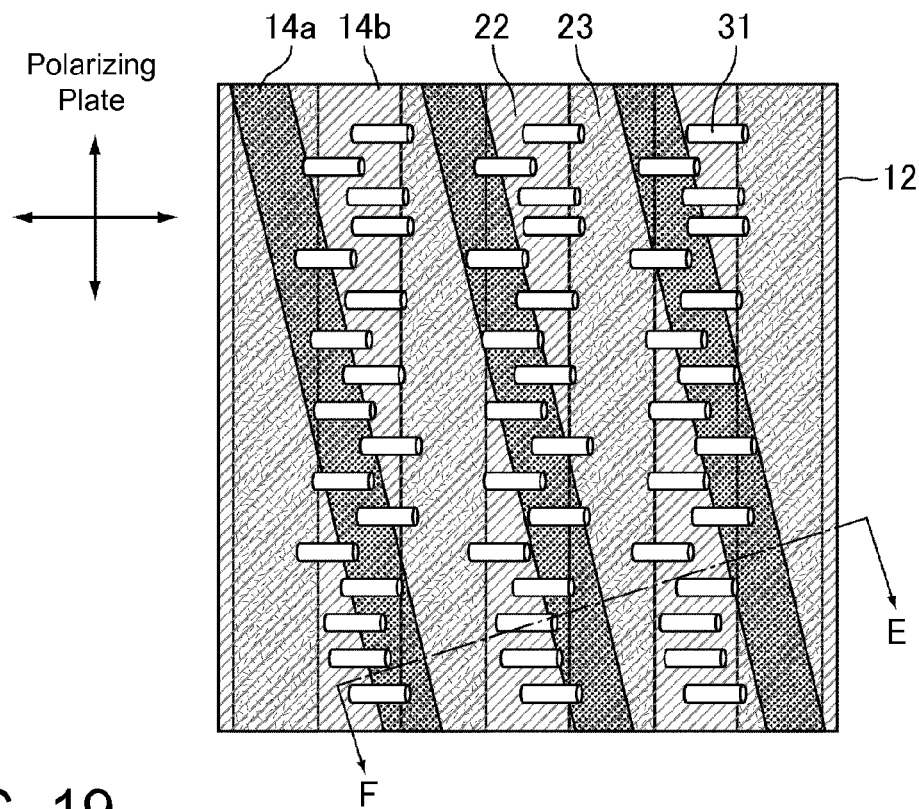
FIG. 18 is a schematic plan view of a liquid crystal display device of Embodiment 3 when a vertical electric field is occurring.

Embodiment 3 is similar to Embodiment 1 except for having dielectric projections (liquid crystal orientation control structure), which are linear in a plan view, formed on the surface of a second common electrode on the liquid crystal layer side, instead of micro-slits. As shown in FIG. 18, the lengthwise direction of dielectric projections 23 is within a 0±20° angle to the lengthwise direction of slits 14b formed in the pixel electrode. It is preferable that the width of the dielectric projections 23 be greater than 5 µm (preferably 5 to 30 µm), and preferable that the width between the adjacent dielectric projections 23 be greater than 5 µm (preferably, 5 to 40 µm).

Figure 19:
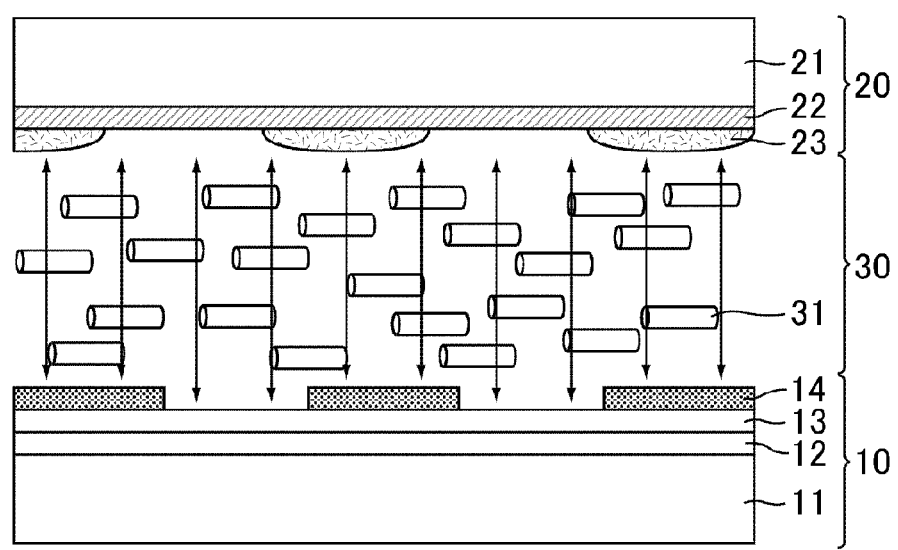
FIG. 19 is a schematic cross-sectional view of the liquid crystal display device along the line E-F in FIG. 18 when a vertical electric field is occurring.

FIG. 18 is a schematic plan view of a liquid crystal display device of Embodiment 3 when a vertical electric field is occurring. FIG. 19 is a schematic cross-sectional view along the line E-F of the liquid crystal display device in FIG. 18 when a vertical electric field is occurring. As shown in FIG. 19, the dielectric projections 23 are formed on the surface of the second common electrode 22 on the liquid crystal layer side.

An organic resin such as a resist or acrylic resin can be suitably used as the material of the dielectric projections 23. The dielectric projections 23 can be formed by coating a resin material on the second substrate before bonding, and then patterning through photolithography after the solvent is removed.

The driving principle is similar to Embodiment 2. In other words, the liquid crystal molecules have a similar orientation to Embodiment 2 by forming a prescribed electric field in the liquid crystal layer. In a manner similar to Embodiment 1, a vertical alignment film is disposed on each of the substrate surfaces in Embodiment 3, but alignment treatments such as rubbing, photoalignment, or the like are not necessary. One characteristic of the present embodiment is that it is possible to attain favorable display characteristics without an alignment treatment.

Embodiment 4

Embodiment 4 is similar to Embodiment 3 except in that the width of dielectric projections (liquid crystal orientation control structure), which are linear in a plan view, formed on the surface of a second common electrode on the liquid crystal layer side, is 2 to 5 µm, and that the lengthwise direction of the dielectric projections is within a 90±20° angle to the lengthwise direction of slits formed in the pixel electrode.

Figure 20:
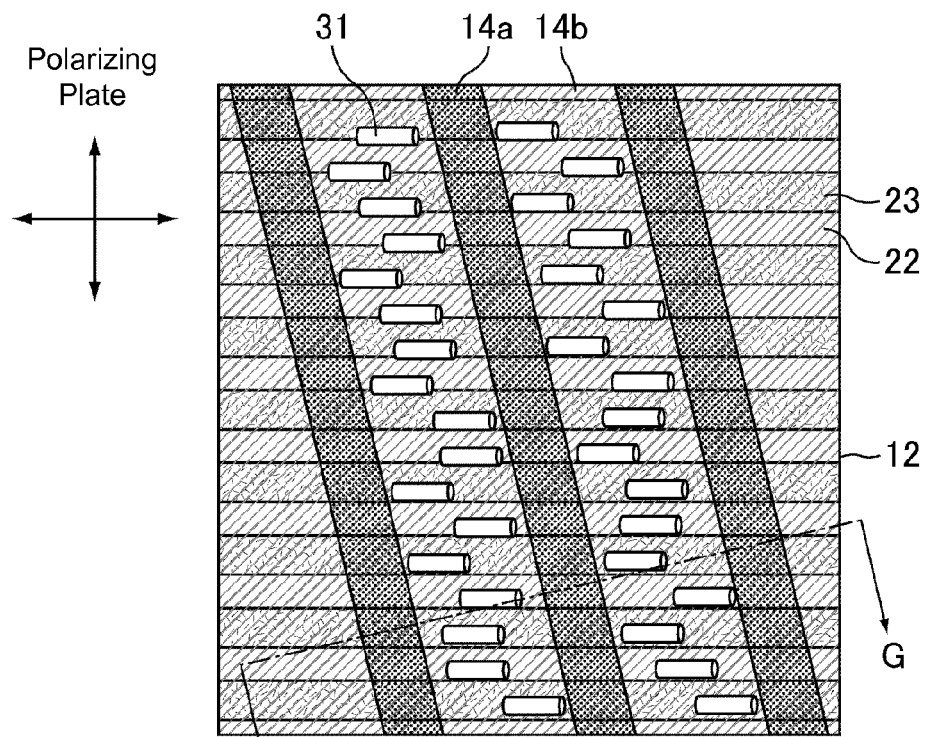
FIG. 20 is a schematic plan view of a liquid crystal display device of Embodiment 4 when a vertical electric field is occurring.
Figure 21:
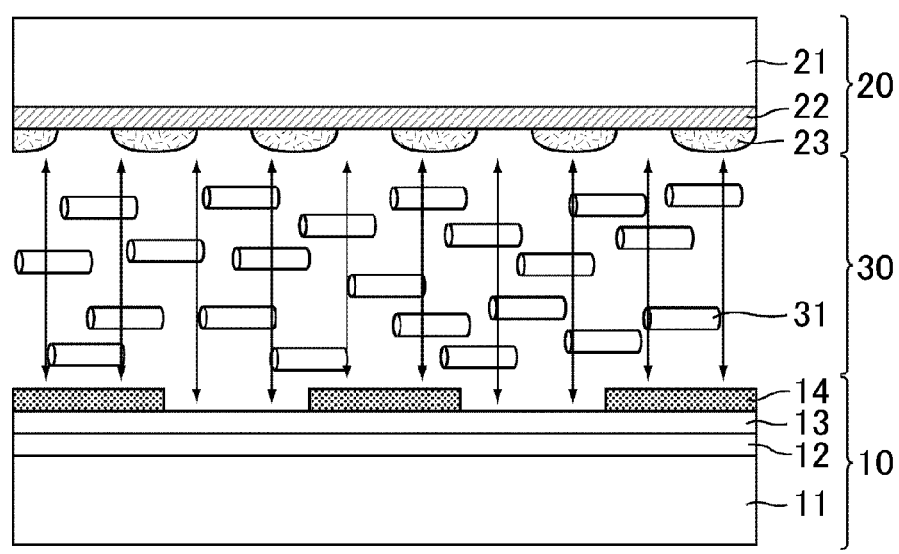
FIG. 21 is a schematic cross-sectional view of the liquid crystal display device along the line G-H in FIG. 20 when a vertical electric field is occurring.

FIG. 20 is a schematic plan view of a liquid crystal display device of Embodiment 4 when a vertical electric field is occurring. FIG. 21 is a schematic cross-sectional view along the line G-H of the liquid crystal display device in FIG. 20 when a vertical electric field is occurring. As shown in FIG. 21, the dielectric projections 23 are formed on the surface of the second common electrode 22 on the liquid crystal layer side. It is preferable that the width of the dielectric projections 23 be 2 to 5 µm. If under 2 µm, then it is difficult to form the dielectric projections 23, but if more than 5 µm, there is a risk that the aperture ratio will decrease. It is preferable that the width between the adjacent dielectric projections 23 be 2 to 5 µm.

The driving principle is similar to Embodiment 1. In other words, the liquid crystal molecules have a similar orientation to Embodiment 1 by forming a prescribed electric field in the liquid crystal layer. In a manner similar to Embodiment 1, a vertical alignment film is disposed on each of the substrate surfaces in Embodiment 4, but alignment treatments such as rubbing, photoalignment, or the like are not necessary. One characteristic of the present embodiment is that it is possible to attain favorable display characteristics without an alignment treatment.

Embodiment 5

Figure 22:
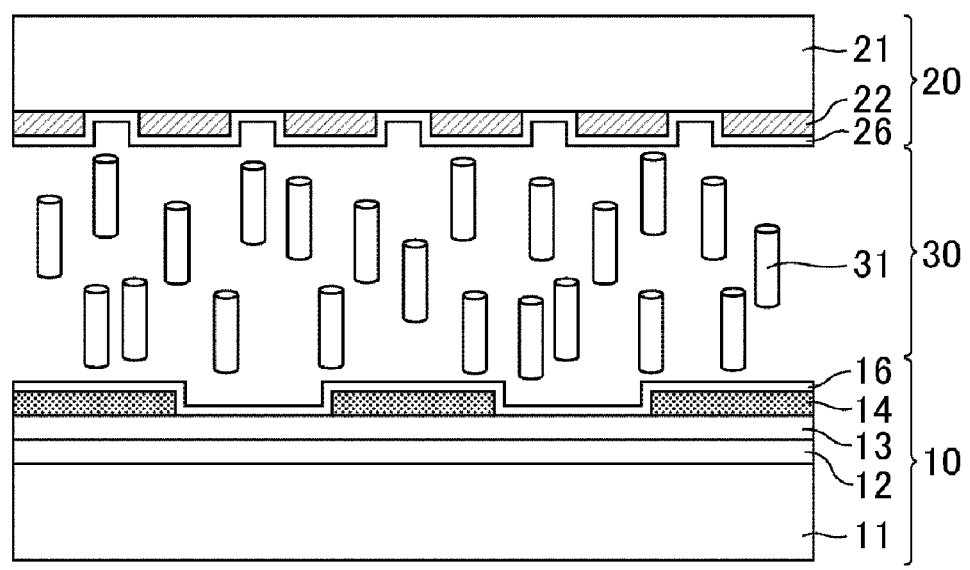
FIG. 22 is a schematic cross-sectional view of a liquid crystal display device of Embodiment 5 when voltage is not being applied.

Embodiment 5 is similar to Embodiments 1 to 4, except in that a polymer layer (PSA layer) that controls the orientation of the liquid crystal molecules is provided on at least one of the first substrate and the second substrate. FIG. 22 is a schematic cross-sectional view of a liquid crystal display device of Embodiment 5 when voltage is not being applied. A first substrate 10 and a second substrate 20 have respective polymer layers 16 and 26 disposed on the surfaces thereof on the liquid crystal layer side.

The polymer layers (PSA layers) 16 and 26 can be formed by liquid crystal components, which are prepared by mixing polymerizable components such as monomers or oligomers with liquid crystal material, being sealed between the substrates 10 and 20, and then applying a voltage between the substrates 10 and 20 to cause the monomers or the like to react and polymerize in a state in which the liquid crystal molecules 31 are tilted. The polymer layers 16 and 26 can maintain the prescribed pre-tilt angle of the liquid crystal molecules 31 even if the applied voltage is removed, and can define the liquid crystal orientation direction. Polymerization of the monomers or the like is performed by heat or light (ultraviolet ray) irradiation.

In FIG. 22, an example is shown of an aspect (Embodiment 1) in which micro-slits 22b are formed in the second common electrode, but in Embodiment 5, an aspect (Embodiment 2) in which slits of a larger width are formed in the second common electrode, or an aspect (Embodiments 3 or 4) in which dielectric projections are provided on the surface of the second common electrode on the liquid crystal layer, may be used. In a manner similar to Embodiment 1, a vertical alignment film is disposed on each of the substrate surfaces in Embodiment 5, but alignment treatments such as rubbing, photoalignment, or the like are not necessary. One characteristic of the present embodiment is that it is possible to attain favorable display characteristics without an alignment treatment.

Embodiment 6

The liquid crystal display device of Embodiment 6 has a first control circuit that supplies electric signals to a first common electrode, and a second control circuit that supplies electric signals to a second common electrode. The present embodiment is characterized in the method of driving the liquid crystal display device and the circuit configuration therefor, and the arrangement configuration of other members forming the liquid crystal display device, the materials thereof, and a method of manufacturing thereof are similar to Embodiments 1 to 5. Examples of the first control circuit and the second control circuit include a display control circuit that generates a prescribed common signal, but these control can use separate power supplies.

When showing a black display image, electric signals are supplied from the first control circuit and the second control circuit, and a voltage is applied between the first common electrode and the second common electrode to form a vertical electric field. The difference in potential between the electric signal supplied to the first common electrode and the electric signal supplied to the second common electric at this time is 10 to 20V. This type of difference in potential allows for the liquid crystal molecules to be oriented substantially horizontal to the substrate surfaces when showing a black display image, and further allows horizontal rotation of the liquid crystal molecules while maintaining this substantially horizontal state when showing a white display image; therefore, a favorable contrast ratio can be attained.

Embodiment 7

The liquid crystal display device according to Embodiment 7 includes a third control circuit that supplies higher frequency AC signals to a second common electrode, and a fourth control circuit that supplies lower frequency AC signals to a pixel electrode. In Embodiment 7, the frequency of the AC signals supplied to the second common electrode is 100 Hz to 10 KHz, for example, and the frequency of the AC signals supplied to the pixel electrode is 60 to 240 Hz, for example. A display control circuit that generates a prescribed common signal is one example of the third control circuit, but a power supply outside the panel may be used, for example. An example of the fourth control circuit includes a source driver that generates prescribed data signals.

The present embodiment is characterized in the method of driving the liquid crystal display device and the circuit configuration therefor, and the arrangement configuration of other members forming the liquid crystal display device, the materials thereof, and a method of manufacturing thereof are similar to Embodiments 1 to 5.

When showing a black display image, high frequency AC signals are supplied from the third control circuit to the second common electrode in order to apply a voltage between the second common electrode and the first common electrode and between the second common electrode and the pixel electrode, thereby causing the generation of a vertical electric field that is substantially perpendicular to the substrate surfaces inside the liquid crystal layer. The liquid crystal molecules orient orthogonally to the direction of the vertical electric field, and thus orient horizontally to the substrate surfaces. When showing a white display image, low frequency AC signals are supplied from the fourth control circuit to the pixel electrode in order to apply a voltage between the pixel electrode and the first common electrode, thereby causing a horizontal electric field to be generated, in addition to the vertical electric field. Due to the liquid crystal molecules attempting to orient perpendicularly to the horizontal electric field, the liquid crystal molecules rotate horizontally with respect to the substrate surfaces.

The second common electrode and the pixel electrode are each connected to different control circuits. When showing a white display image, there are timings when the switching of positive and negative electric signals supplied to the pixel electrode overlaps with the switching positive and negative electric signals supplied to the second common electrode. The potential applied between the second common electrode and the first common electrode or between the second common electrode and the pixel electrode is cancelled out, and there is a risk that display unevenness could occur due to the liquid crystal molecules orienting perpendicularly to the substrates as the potential becomes smaller than the necessary voltage for maintaining the liquid crystal molecules horizontal to the substrate surfaces.

In Embodiment 7, the frequency of the electric signals supplied to the second common electrode greatly differs from the frequency of the electric signals supplied to the pixel electrode; therefore, it is possible to pseudo-eliminate the overlapping timing of the positive and negative switching of the electric signals supplied to the pixel electrode and the second common electrode. Thus, it is possible to maintain the necessary voltage for causing the liquid crystal molecules to horizontally orient with respect to the substrate surfaces between the second common electrode and the pixel electrode, thereby making it possible to suppress uneven display.

Figure 23:
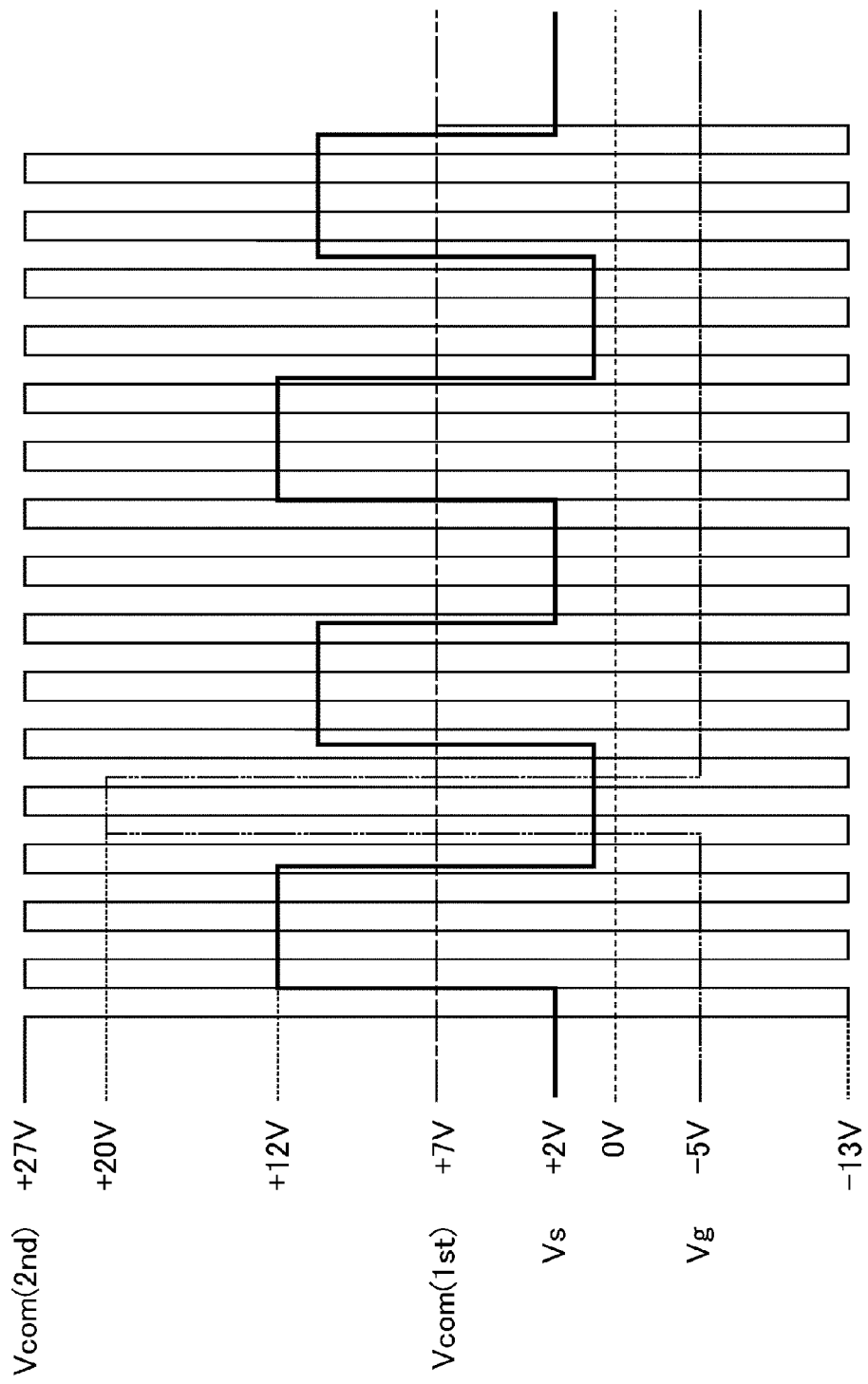
FIG. 23 is a timing chart showing one example of applied voltage in Embodiments 6 and 7.

FIG. 23 is a timing chart showing one example of applied voltage in Embodiments 6 and 7. In the example shown in FIG. 23, a common potential (Vcom(1st)) of +7V is supplied to the first common electrode. A potential (Vcom (2nd)) of −13V and +27V is alternately applied for a uniform length of time to the second common electrode from an external power supply such that the difference in potential with the first common electrode becomes 20V. A source potential (Vs) is supplied from the source driver to the data signal line so as to have a difference in potential with respect to the common potential. The frequency of the common signal (AC) supplied to the second common electrode is 200 Hz, and a frequency of the data signal (AC) supplied to the data signal line is 60 Hz.

When a gate potential Vg (+15V) is supplied to the scan signal line, a source potential Vs (+2V) is written to the pixel electrode through the corresponding TFT. This makes it possible to generate a difference in potential of 5V between the pixel electrode and the first common electrode for a single frame period, thereby generating a horizontal electric field. This results in the liquid crystal molecules rotating horizontally with respect to the substrate surfaces, which enables white display. In this example, the external power supply that supplies the common potential to the second common electrode functions as a control circuit for both the second control circuit and the third control circuit.

Embodiment 8

The liquid crystal display device of Embodiment 8 has a backlight unit, a backlight unit control circuit, a fifth control circuit that supplies electric signals to a second common electrode, and a sixth control circuit that provides electric signals to a pixel electrode.

The present embodiment is characterized in the method of driving the liquid crystal display device and the circuit configuration therefor, and the arrangement configuration of other members forming the liquid crystal display device, the materials thereof, and a method of manufacturing thereof are similar to Embodiments 1 to 5.

According to one example shown in Embodiment 6 and Embodiment 7, a voltage can be regularly applied between the pixel electrode and the second common electrode, thereby making it possible to attain excellent display characteristics, but the increase in power consumption due to a relatively high voltage being applied at a high frequency is a problem. If a lower potential and lower frequency voltage is applied to the second common electrode in order to lower this power consumption, however, then as explained in Embodiment 7, it becomes impossible to maintain the necessary voltage for having the liquid crystal molecules be horizontal with respect to the substrate surfaces when the positive and negative switching of the electric signals supplied to the pixel electrode overlap with the positive and negative switching of the electric signals supplied to the second common electrode. This causes light leakage when showing a black display image.

Figure 24:
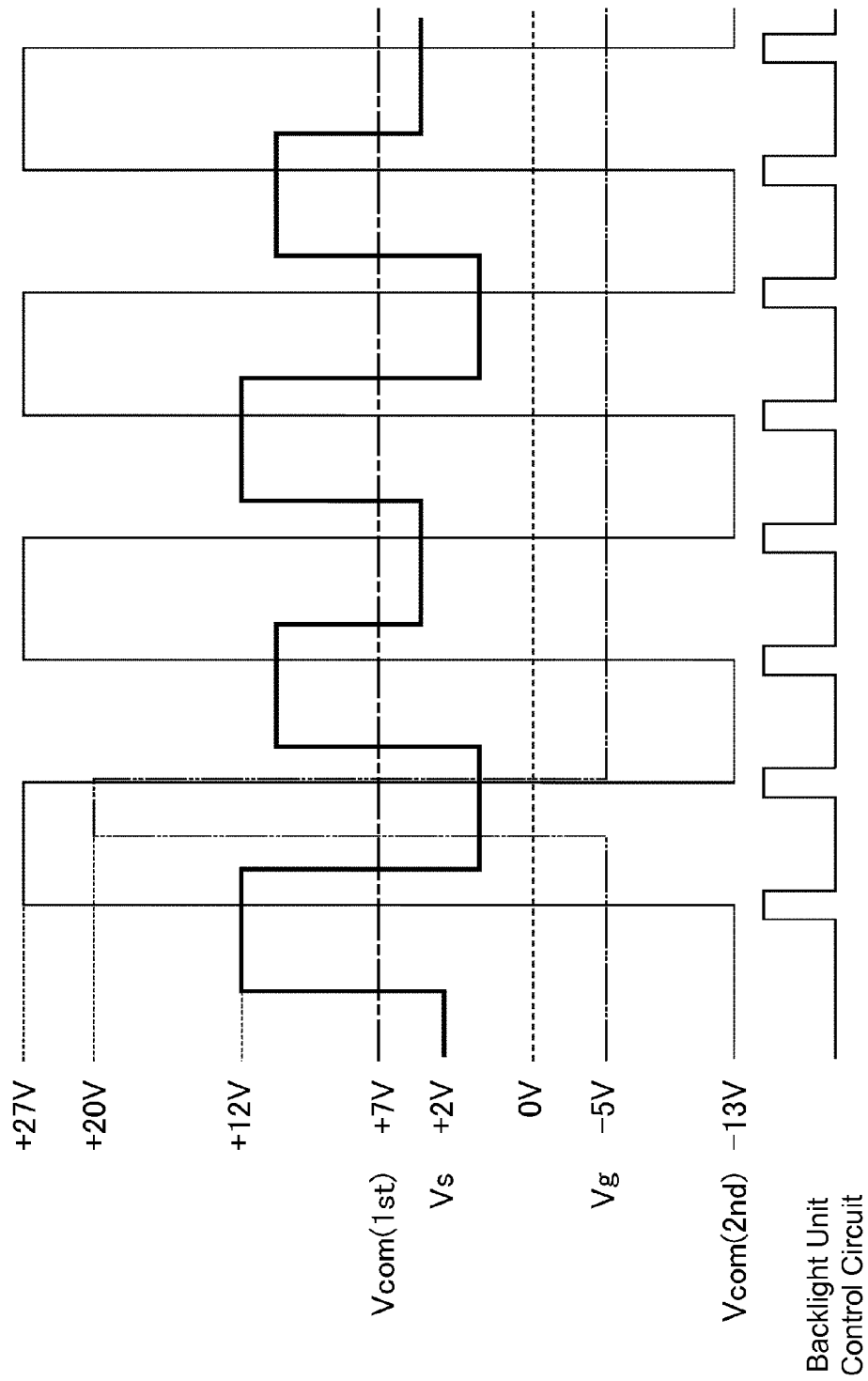
FIG. 24 is a timing chart showing one example of applied voltage in Embodiments 6 and 8.

FIG. 24 is a timing chart showing one example of applied voltage in Embodiments 6 and 8. In Embodiment 8, the fifth control circuit that supplies AC signals to the second common electrode is caused to sync with the backlight unit control circuit in order to turn off the backlight unit when the positive and negative potential supplied to the second common electrode is switched. Due to this, even if the frequency of the AC signals supplied to the second common electrode and the frequency of the AC signals supplied to the pixel electrode is the same with respect to the sixth control circuit that supplies AC signals to the pixel electrode, it is possible to suppress light leakage when showing a black display image occurring when the positive and negative potential supplied to the second common electrode is switched, thereby making it possible to suppress a drop in contrast ratio.

Various embodiments and modification examples were described above, but these embodiments and modification examples may be appropriately combined together to simultaneously achieve the respective effects thereof.

DESCRIPTION OF REFERENCE CHARACTERS 1 data signal line
2 scan signal line
3 drain lead out wiring line
4 contact
5 TFT (thin film transistor)
6 common wiring line or storage capacitance wiring line
7 opening in first common electrode
10 first substrate (array substrate)
11, 21 support substrate
12 first common electrode
13 insulating film
14 pixel electrode
14a comb-shaped part of pixel electrode
14b slit formed in pixel electrode
14c main axis part of pixel electrode
15 third common electrode
15a comb-shaped part of third common electrode
15b slit formed in third common electrode
15c main axis part of third common electrode
16, 26 polymer layer
20 second substrate (opposite substrate)
22 second common electrode
22a comb-shaped part of second common electrode
22b micro-slit formed in second common electrode
22c connection part of second common electrode
22d main axis part of second common electrode
23 dielectric projection
24 second common electrode
24a comb-shaped part of second common electrode
24b slit formed in second common electrode
30 liquid crystal layer
31 liquid crystal molecule

What is claimed is:
1. A liquid crystal display device, comprising:
a first substrate having a plate-shaped first common electrode, and a pixel electrode that is provided in a separate layer from the first common electrode with an insulating film therebetween;
a second substrate facing the first substrate; and
a liquid crystal layer sandwiched between the first substrate and the second substrate, said liquid crystal layer comprising liquid crystal molecules that have a negative dielectric anisotropy,
wherein the second substrate has a second common electrode having a comb-shaped structure as a liquid crystal orientation control structure that is linear in a plan view, the comb-shaped structure having comb fingers extending in a first direction and receiving a same electrical potential so as to restrict tilting directions of the liquid crystal molecules to the first direction,
wherein the pixel electrode has a comb-shaped structure having comb fingers extending at an angle relative to the first direction,
wherein the liquid crystal molecules are initially oriented vertically and are titled to said first direction that is parallel to the first and second substrates in response to a potential differential applied between the pixel electrode and the second common electrode, and
wherein the first substrate further includes a third common electrode having a comb-shaped structure, comb fingers of the third common electrode and the comb fingers of the pixel electrode being in parallel with each other and being interlocked with each other, and receiving mutually different electrical potentials so as to cause the liquid crystal molecules that have been tilted to said first direction to rotate horizontally.

2. The liquid crystal display device according to claim 1, wherein said angle at which the comb fingers of the pixel electrode extend relative to the first direction is within 0±20° or within 90±20°.

3. The liquid crystal display device according to claim 1, wherein spacing between the comb fingers of the second common electrode is 2 to 5 μm.

4. The liquid crystal display device according to claim 1, wherein a width of the comb fingers of the second common electrode is 2 to 5 μm.

5. The liquid crystal display device according to claim 1, wherein a lengthwise direction of slits defined by the comb fingers of the second common electrode is at a 90±20° angle to a lengthwise direction of slits defined by the comb fingers of the comb-shaped structure of the pixel electrode.

* * * * *